United States Patent [19]

Walker

[11] Patent Number: 5,101,925
[45] Date of Patent: Apr. 7, 1992

[54] HYDRAULIC WHEEL MOTOR AND PUMP

[76] Inventor: Frank H. Walker, 7271 Green Valley Dr., Grand Blanc, Mich. 48439

[21] Appl. No.: 672,471

[22] Filed: Mar. 20, 1991

Related U.S. Application Data

[62] Division of Ser. No. 412,093, Sep. 25, 1989, Pat. No. 5,000,282, which is a division of Ser. No. 185,122, Apr. 22, 1988, Pat. No. 4,883,141.

[51] Int. Cl.$^5$ ............................................. B60K 25/04
[52] U.S. Cl. ..................... 180/243; 60/487; 91/491; 180/307; 180/308
[58] Field of Search ............... 91/491, 496; 60/487, 60/489; 180/242, 243, 307, 308, 305, 244, 245, 246

[56] References Cited

U.S. PATENT DOCUMENTS

| | | | |
|---|---|---|---|
| 2,350,683 | 6/1944 | Jossim et al. | 180/305 X |
| 2,418,123 | 4/1947 | Joy | 180/308 |
| 3,179,016 | 4/1965 | Thornton et al. | 180/308 |
| 3,280,934 | 10/1966 | De Biasi | 180/308 |
| 3,303,901 | 2/1967 | Schou | 180/242 X |
| 3,584,698 | 6/1971 | Larson et al. | 180/308 |
| 3,612,205 | 10/1971 | Barrett | 180/308 |
| 3,747,722 | 7/1973 | Finney | 180/243 |
| 3,874,470 | 4/1975 | Greene | 180/243 X |
| 4,236,585 | 12/1980 | Beck | 180/243 |
| 4,399,886 | 8/1983 | Pollman | 180/242 X |
| 4,484,655 | 11/1984 | Sheppard, Sr. | 180/308 |
| 4,503,928 | 3/1985 | Mallen-Herrero et al. | 180/308 |
| 4,570,741 | 2/1986 | McCoy | 180/242 |
| 4,738,332 | 4/1988 | Wright | 180/242 X |
| 4,903,792 | 2/1990 | Ze-Ying | 180/308 |

Primary Examiner—Andres Kashikow
Assistant Examiner—Michael Mar
Attorney, Agent, or Firm—Brooks & Kushman

[57] ABSTRACT

A hydraulic wheel motor and pump are provided for use with a motor vehicle having a pair of mechanically driven wheels and a pair of non-mechanically driven wheels. The hydraulic pumps cooperate with the mechanically driven wheels, and the hydraulic motors are coupled to the non-mechanically driven wheels. The pumps and motors are diagonally connected to one another to create a four wheel drive vehicle. Also shown is an apparatus and method for independently controlling the tractive force of the vehicle wheels during a turning maneuver.

5 Claims, 10 Drawing Sheets

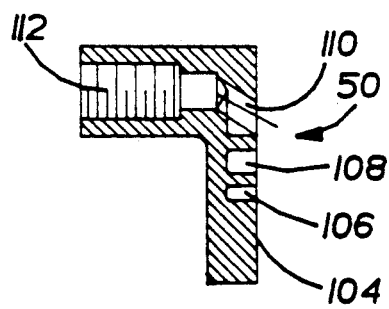
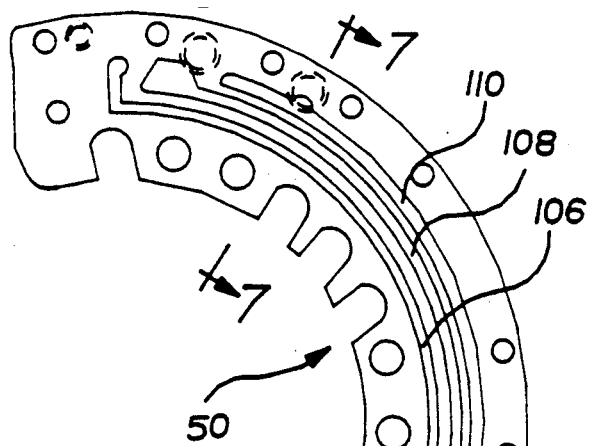
FIG-7
FIG-6
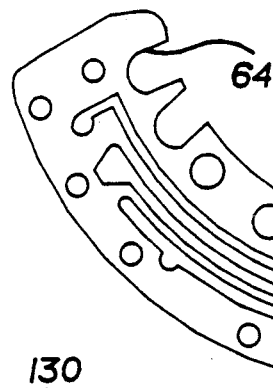
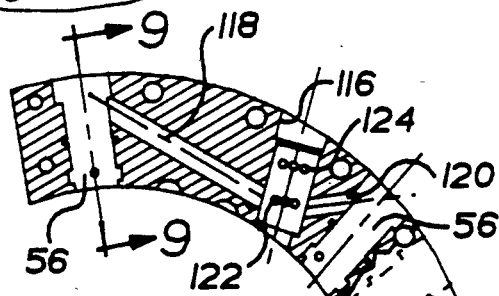
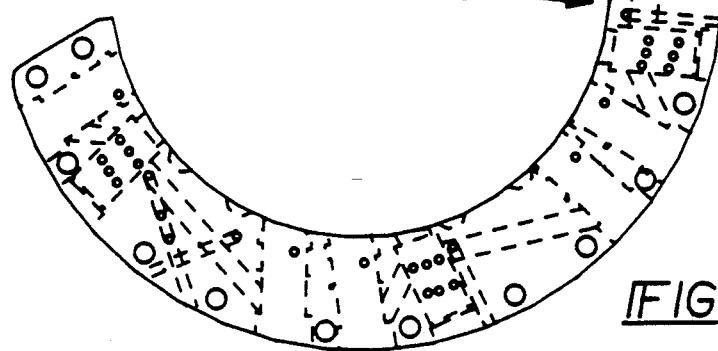
FIG-9
FIG-8

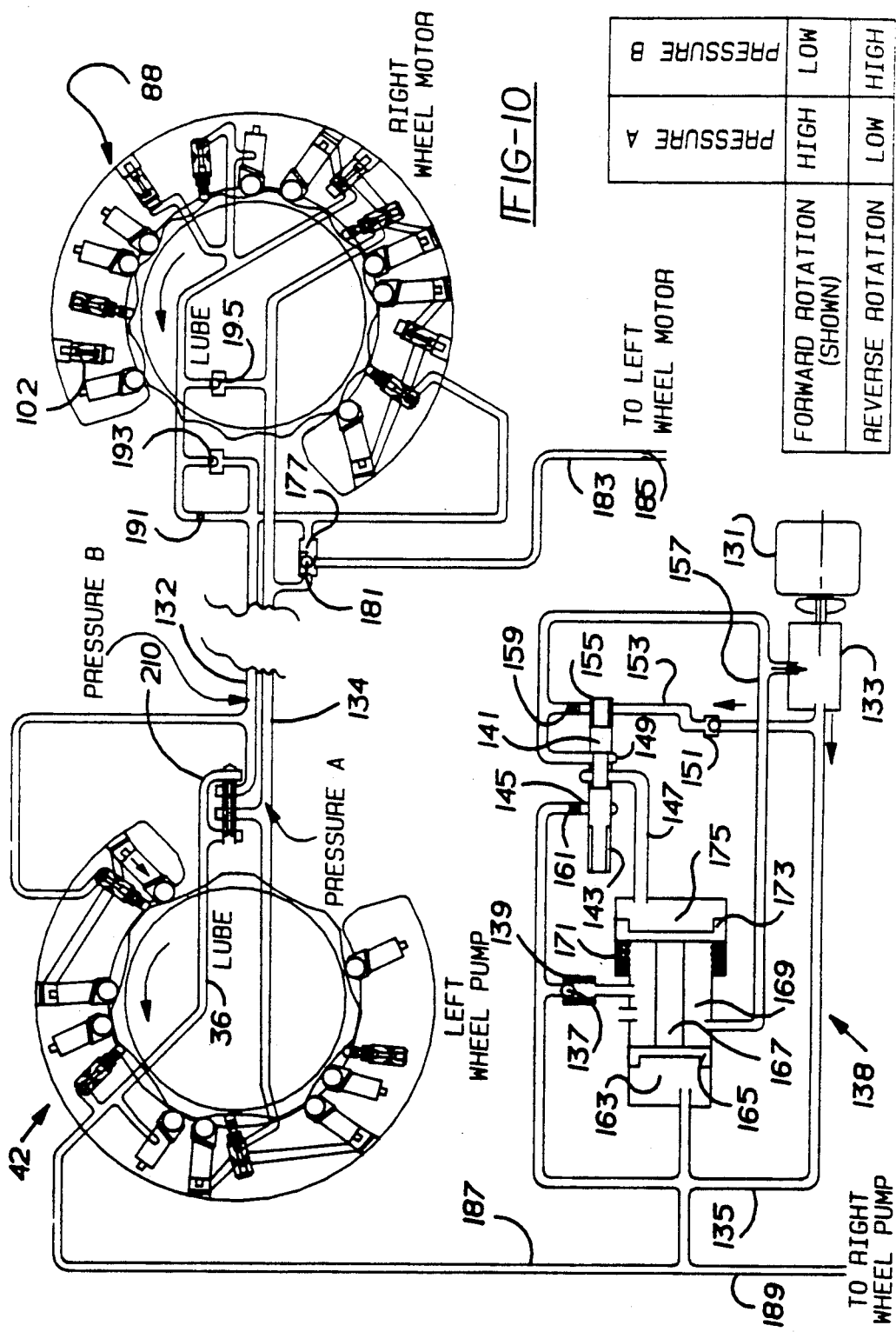

HYDRAULIC WHEEL MOTOR AND PUMP

This is a divisional of copending application Ser. No. 412,093 filed on Sept. 25, 1989, now U.S. Pat. No. 5,000,282, as a divisional of application Ser. No. 185,122 filed on Apr. 22, 1988 and issued on Nov. 28, 1989 as U.S. Pat. No. 4,883,141.

FIELD OF INVENTION

This invention relates to four wheel drive vehicles, and more particularly to vehicles utilizing hydraulic drive motors to drive the non-mechanically driven wheels.

BACKGROUND OF INVENTION

Hydraulic drive motors have been used on various automotive and non-automotive vehicles for years. Hydraulic wheel motors have achieved a fair degree of commercial success in farm and off road vehicles, as shown in U.S. Pat. No. 3,584,698, assigned to Caterpillar Tractor Company. A number of hydraulic wheel motors are shown in the prior art, such as those disclosed in U.S. Pat. Nos. 2,418,123, 3,179,016, 3,280,934, 3,584,698 and 3,612,205. These hydraulic wheel motors are provided with a rotary member and a stationary member having a plurality of cavities for pumping hydraulic fluid which periodically varies in displacement as the stationary and the rotary member move relative to one another. Hydraulic fluid from an engine driven pump is supplied to the hydraulic wheel motors for propelling the vehicle.

Finney, in U.S. Pat. No. 3,747,722 first suggested the use of pumps cooperating with the mechanically driven wheels of a vehicle to hydraulically drive hydraulic wheel motors coupled to the non-mechanically driven wheels. The pumps and motors are attached to the vehicle outboard of the axle and brake drum, thereby increasing the vehicle's track by two times the pump thickness. The Finney system coupled front and rear wheels on the same side of the vehicle together hydraulically.

An object of the present invention is to provide a hydraulic drive apparatus to convert a two wheel drive to a four wheel drive vehicle with minimal alteration to the vehicle, and without increasing the vehicle track.

Another object of the present invention is to provide a hydraulic four wheel drive mechanism which can be utilized at low speeds and disengaged at high speeds to eliminate friction loss.

Yet another object of the invention is to provide independently controllable hydraulic wheel motors or pumps adjacent each wheel which can be regulated to maximize tractive force in steering maneuvers.

These and other objects, feature and advantages of the present invention will be more fully understood with reference to the drawings, specification, and claims.

SUMMARY OF THE INVENTION

Accordingly, a hydraulic drive apparatus of the present invention is intended for use in a motor vehicle having a pair of mechanically driven wheels and a pair of non-mechanically driven wheels, each of which is provided a disc brake and caliper mechanism. The hydraulic drive apparatus includes a pair of rotary hydraulic pumps cooperating with the mechanically driven wheels, and a pair of rotary hydraulic motors cooperating with the non-mechanically driven wheels. Each of the pumps and motors are provided with a stationary member affixed relative to the brake caliper and a rotary member affixed relative to the brake disc. The stationary member is oriented adjacent to and axially spaced from the brake disc forming a semi-circular segment circumaxially aligned with the brake caliper. Fluid conduits connect the pair of hydraulic pumps to a pair of hydraulic motors causing all of the wheels to be driven.

A variable displacement mode hydraulic motor is also described which automatically increases in displacement, resulting in higher active force upon the occurrence of a predetermined amount of driven wheel slippage.

BRIEF DESCRIPTION OF DRAWINGS

FIG. 6 is a side elevation of a hydraulic pump channel plate;

FIG. 7 is a cross-sectional view taken along line 7—7 of FIG. 6

FIG. 8 is a side elevation of a hydraulic motor valve body;

FIG. 9 is a sectional view taken along line 9—9 of FIG. 8;

FIG. 10 is a partial schematic view of a hydraulic drive apparatus showing the hydraulically connected pump and motor and the actuator system in schematic form;

BRIEF DESCRIPTION OF PREFERRED EMBODIMENT

Figure 1:
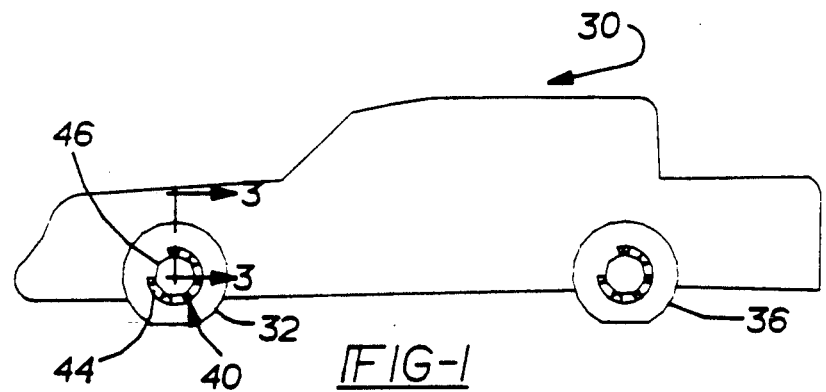
FIG. 1 is a side elevation of a motor vehicle showing a location on the hydraulic drive apparatus.
Figure 2:
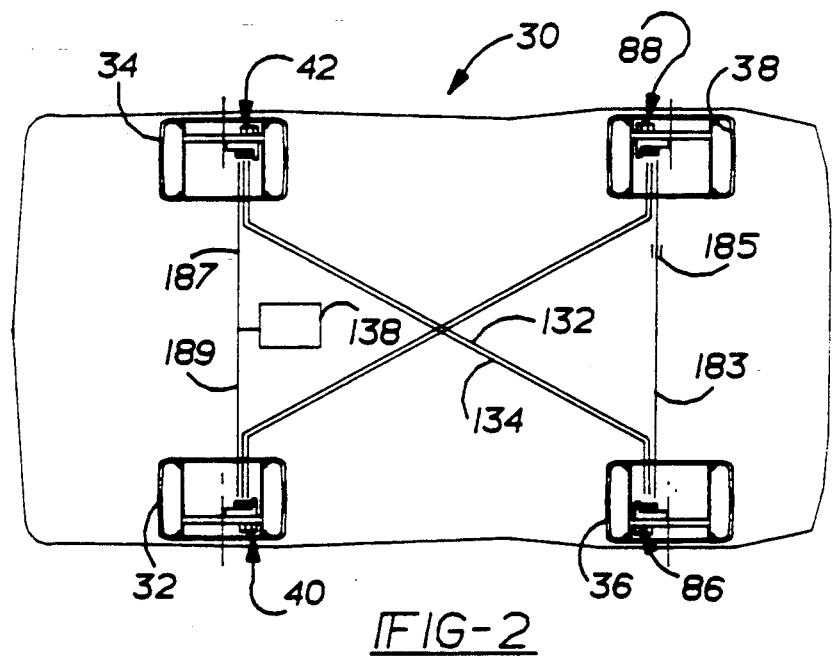
FIG. 2 is a schematic top view of the vehicle in FIG. 1.

FIGS. 1 and 2 show a representative motor vehicle 30 equipped with a hydraulic drive apparatus of the present invention. The motor vehicle 30 is provided with a pair of front wheels 32 and 34, and a pair of rear wheels 36 and 38. The vehicle shown in the drawings has the front wheels mechanically driven in conventional front wheel drive manner. The invention can also be used on rear wheel drive vehicles, and is equally adaptable to vehicles with automatic or manual transmissions. The mechanically driven wheels, however, drive a pair of rotary hydraulic pumps mounted adjacent the conventional disc and caliper brake mechanism. Front wheels 32 and 34 are provided with rotary hydraulic pumps 40 and 42, respectively. The hydraulic pumps 40 and 42 are each provided with a stationary member 44 and a rotary member 46. The stationary member is a semi-circular segment aligned with the wheel axis as shown.

Figure 3:
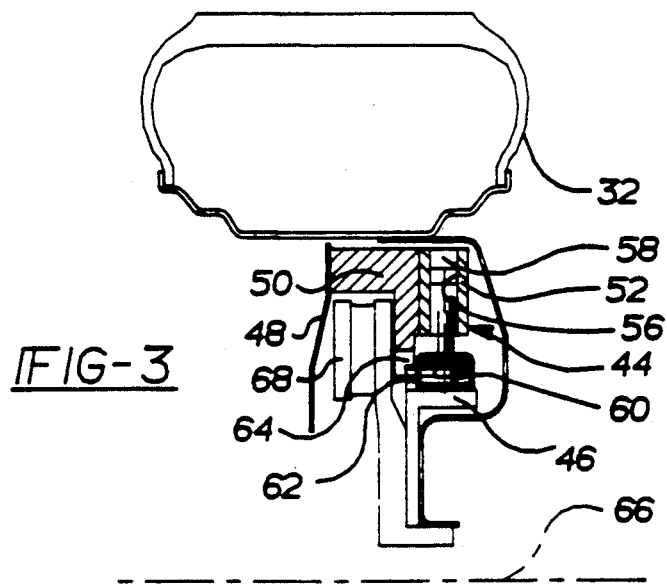
FIG. 3 is an enlarged partial sectional view taken along line 3—3 of FIG. 1.

The orientation of the stationary member 44 and the rotary member 46 relative to the vehicle wheel assembly and disc and caliper brake mechanism can be more clearly seen in FIG. 3. Stationary member 44 is affixed to brake backing plate 48 which is fixed relative to the spindle assembly, and also serves to support the brake caliper. Stationary member 44 is made up of two main components; channel plate 50; and cylinder block 52. A piston assembly 54 is shown in a cylindrical bore 56 and cylinder block 52. The cylinder bore is enclosed by end cap 58 which defines a variable on a displacement volume bounded by the cylinder bore, the end cap and the piston assembly. The piston assembly is provided with a roller follower which rides upon the outer periphery of the rotary member 46. The piston assembly is also provided with an alignment roller 62 which translates within a notch 64 and channel plate 50. Alignment of roller 62 and notch 64 keep the piston assembly oriented within the bore so that the roller follower axis is substantially parallel to axis 66 about which the wheel brake rotor 68 and the rotary member 46 turn.

Figure 4:
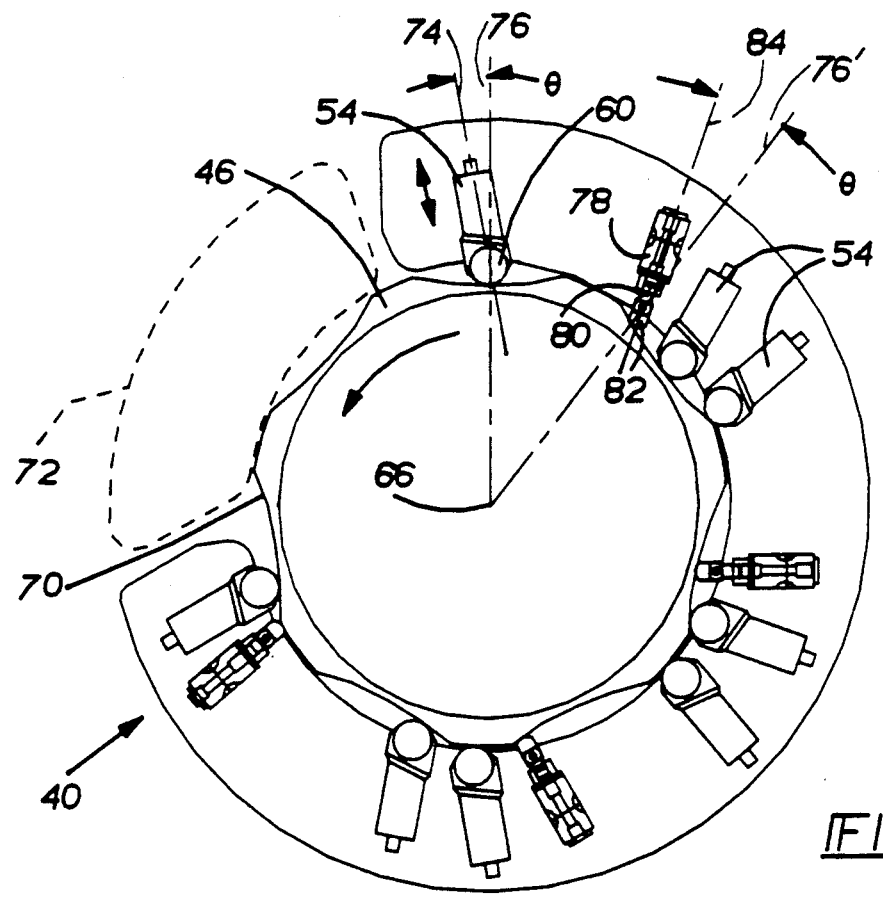
FIG. 4 is an enlarged cut-away side elevation of a hydraulic motor.

As can be seen in FIG. 4, rotary member 46 is generally cylindrical in shape having a plurality of cam lobes 70 oriented on its outer periphery. The rotary member 46 has an outer diameter which is limited sufficiently so that the cam lobes will not engage the brake caliper 72, shown in phantom outline. When the vehicle is driving in a forward direction, rotary member 46 turns in the direction of the arrow shown. As the rotary member turns, piston assemblies 54, reciprocate within their respective bores. Note, the axis of the cylinder bore 74 is inclined in the forward rotation direction relative to a radial line extending from wheel axis 66 through the center of roller follower 60 by an angle $\theta$. $\theta$ is preferably within the range of 5° to 20°, and is selected to minimize piston friction forces, and thus reduce wear and improve operating efficiency. Since the vehicle is run in a forward direction for a very high proportion of the time, inclining the cylinder bore forward in the direction of rotation, although resulting in much higher side load in the reverse direction, substantially reduces side loading in the forward direction to result in a net overall wear reduction.

As the rotary member 46 rotates, piston assembly 54 reciprocates causing the volume bounded by the cylinder bore, end cap and pistons to vary in displacement. In order to effectively utilize this volume change to pump fluid, an exit port is provided which communicates with the enclosed region (shown in FIG. 10), which is connected to the timing valve assembly 78. The timing valve 78 is provided with a spool 80 and follower 82 which translate along a valve axis 84 oriented relative to radial line 76', similar to the orientation of the piston assembly relative to radial line 76.

In the preferred embodiment shown, the rotary hydraulic pump 40 is provided with eight piston assemblies mounted within the stationary member 44 for reciprocal movement relative thereto in response to the rotation of rotary member 46, which is provided with seven lobes 70. Four timing valve assemblies 78 are provided, one timing valve cooperating with two piston assemblies.

As will be described in more detail, subsequently, when the piston assemblies move radially outwardly, the piston port is coupled to the pump output by the valve member. When the piston is moving radially inwardly, the piston port is coupled to the pump input by the valve member. During a single wheel rotation, each of the eight pistons will reciprocate seven times, resulting in a total of 56 output pulses and 56 input pulses. The shape and timing of these pulses is carefully controlled by the profile of lobes 70.

In the preferred embodiment of the hydraulic pump shown, it is specifically designed to compactly fit within traditionally unused space surrounding the brake rotor and brake caliper. Typically, the brake caliper in a disc brake system occupies a very small segment of the disc, typically, in the order of 90°. Since the caliper is much wider than the disc, the vehicle wheel must be designed to clear the caliper when it rotates. A large semi-circular toriodal segment is typically unutilized. As shown in FIG. 3, the rotary member 46 is affixed to the brake disc 68 projecting axially outward therefrom. The stationary member which is generally semi-circular shaped is mounted radially outwardly from the rotary member surface adjacent to, and axially spaced from the brake disc 68. The rotary hydraulic pump can thereby be fabricated into a small compact unit which requires little or no modification to the vehicle wheel and the brake disc, and only slight modification to the caliper support plate to facilitate the attachment of the stationary and rotary members.

In operation, rotary hydraulic pumps 40 are oriented at each of the mechanically driven wheels. Rotary hydraulic motors 86 and 88 cooperate with each of the non-mechanically driven wheels. The high pressure fluid inputs to motors 86 and 88 are connected by restricted passageway 183. The limited flow is sufficient to enable the vehicle to make tight turns without scrubbing the tires.

Figure 5:
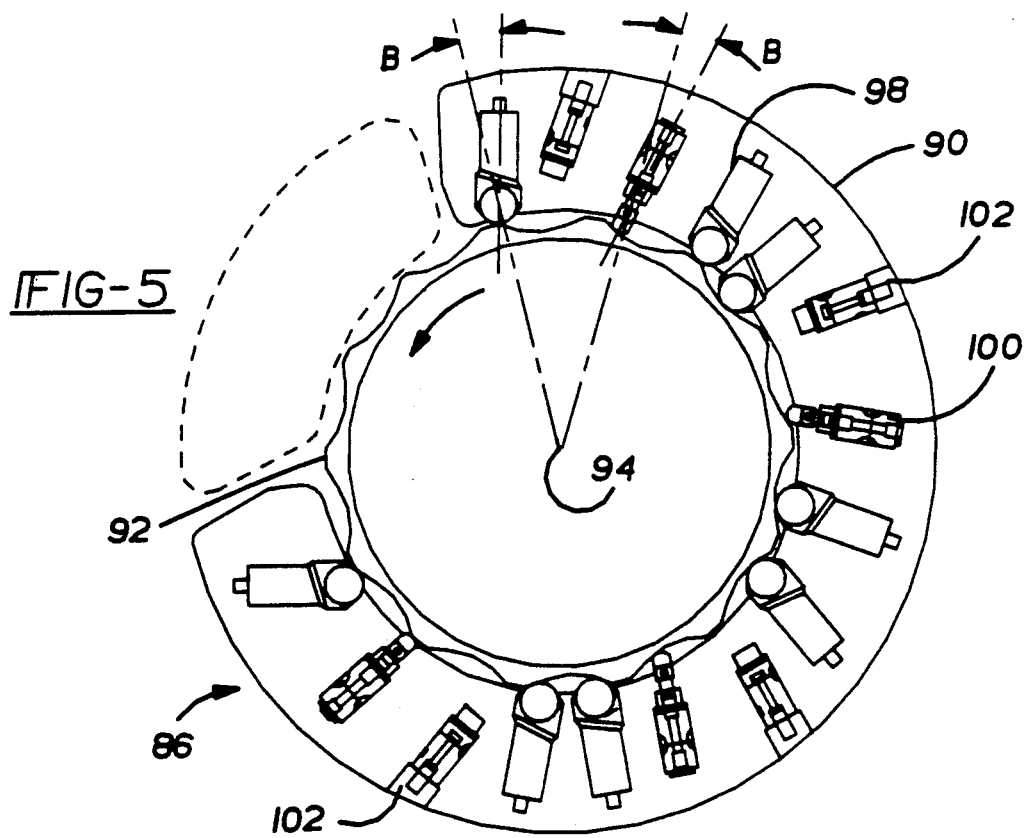
FIG. 5 is a side elevation of a hydraulic pump.

The hydraulic motors are basically similar to the hydraulic pump. Each hydraulic motor is provided with a stationary member 90 and a rotary member 92. As in the stationary member of the pump, and for the same reasons of improving efficiency and reducing wear in the forward direction of rotation, the axis of the cylinder bore is inclined relative to a radial line. However, inasmuch as the motor has the higher piston forces during the inward stroke of the piston, while the pump has its higher forces on the outward stroke, the direction of inclination for the motor is opposite the pump, i.e., opposite to the direction of forward wheel rotation. This is shown as angle $\beta$ in FIG. 5. Rotary member 92 rotates about wheel axis 94 in the direction of the arrow when the vehicle is moving forward. Rotary member 92 is provided with a plurality of lobes on the outer periphery surface which cooperate with plurality piston assemblies 98 which reciprocate in cylindrical bores formed in the stationary member.

The rotary member 92 is provided with fourteen lobes in the preferred embodiment shown, and eight piston assemblies which would cause the motor volume to be approximately double the pump volume, provided the displacement per cylinder is substantially the same. The motor 86 is designed to run in either of two modes; a synchronous mode; and a high torque mode. During the synchronous mode half of the piston assemblies are deactivated and shifted radially outwardly so as to not engage the rotary member periphery. With only four pistons actively functioning, the rotation of the hydraulic motor results in each of the four pistons reciprocating fourteen times, generating fifty-six pressure and inlet pulses. The piston assemblies and their respective bores define enclosed volumes similar to that of the hydraulic pump which are connected to timing valves 100 by a fluid passageway not shown. In the synchronous mode, the displacement of the pump and the displacement of the motor are substantially the same, causing the mechanically driven wheel and the hydraulic driven wheel to turn at the same speed. Since there will invariably be some leakage, preferably the motor displacement is slightly less than the pump displacement. Preferably, the pump displacement is 2% to 8% greater than the motor displacement, and most preferably, the pump displacement is 5% greater than the motor displacement. Not only does this displacement difference result in compensation for leakage, but it helps balance the road load tractive force out among all of the vehicle wheels.

In a non-synchronous mode, all of the eight motor pistons actively engage the rotary member effectively doubling the size of the motor displacement. This causes the hydraulically driven wheels to turn at half of the speed of the mechanically driven wheels. The motor will go into the non-synchronous mode in rare occasions, such as when a vehicle is stuck in the snow and the mechanically driven wheels are unable to achieve traction. By effectively increasing the displacement of the motor, the hydraulically driven wheels can be turned at a reduced speed at much higher torque, enabling the vehicle to free itself from conditions in which it can not do in the synchronous mode. The motor is shifted between the synchronous and non-synchronous mode by threshold valve 102. The non-synchronous mode can be entered into automatically as a function of line pressure or manually by controlling the magnitude of the lube pressure. The threshold valve 102 is conveniently located within the cylinder block adjacent the piston assembly which it regulates.

The construction of a channel plate and the cylinder block which make up the stationary member of the rotary motor is shown in more detail in FIGS. 6-9. Channel plate 50 is generally semi-circular in shape having a L-shaped cross-section, as shown in FIG. 7. The channel plate is provided with a planar face 104 which sealingly cooperates with the cylinder block 52 which is affixed thereto. Machined or cast into the face of the channel plate are three generally arcuate shaped grooves providing fluid passageways. A groove 106 provides a lubrication fluid channel. Another groove 108 provides a pressure A channel, and a third groove 110 provides a pressure B channel.

When the vehicle is driving forward, the pressure in A channel is high and the pressure in B channel is low. In reverse, pressure A channel is low and the pressure B channel is high. Channels 106, 108 and 110 extend circumaxially about the face 104 to cooperate with corresponding ports formed in the cylinder block accompanying each of the timing valves. All three of the fluid channels are provided with an outlet, such as B channel output 112, shown in FIG. 7, which couples the rear motor with the corresponding pump. Grooves 64, which serve to align the pistons and timing valve, are machined in the channel plate, as shown in FIG. 6. Cylinder block 52 shown in FIGS. 8 and 9 is provided with a face 114 which sealingly engages face 104 of channel plate 50. Cylinder block 52 is provided with cylindrical bores 56 for the piston assemblies, and bores 116 for the timing valve assembly 78. Each timing valve cavity is connected to two cylindrical bores containing piston assemblies by way of fluid passageways 118 and 120. These fluid passageways are alternatively coupled either to pressure B channel or pressure A channel, dependent upon the position of the timing valve. Ports 122 and 124 extend between the timing valve bore and channels A and B respectively.

A lubrication channel 106 in the channel plate is coupled to the various piston assemblies and valves which reciprocate in the cylinder block. As shown in FIG. 9, cylinder bore 156 is coupled to lube channel 106 by lube port 126. Preferably, cylinder bore 156 is provided with a pair of O-ring grooves 128 and 130 axially spaced on opposite sides of lube port 126. The lubrication region bounded between the O-rings also serves as a buffer to limit the pressure exerted on the outermost seal, O-ring 128.

The hydraulic wheel motor and pump system is schematically shown in FIG. 10. Right front hydraulic pump 142 is shown connected to the left rear hydraulic motor 88. Also depicted schematically are the A and B pressure lines 132 and 134 which hydraulically interconnect the motor and the pump. FIG. 10 also schematically shows the arrangement of the lubrication system 136 and actuator system 138.

The actuator circuit is used to turn the four wheel drive system on and off, either manually by driver control, or automatically by reacting to signals from a controller which could be activated by signals such as vehicle speed, wheel slip, and engine torque. To engage the four wheel drive, the electric motor 131 is turned on, driving charge pump 133. The charge pump receives fluid from oil sump 169 through passage 157, and discharges fluid at a higher pressure through passage 135. Pressurized fluid flows out of the pump through check valve 151 to port 155, after which it is inhibited by orifice 159 so that a pressure is built up in the port 155. The pressurized fluid acts upon valve 141, causing the valve to overcome spring 143 and move to the left, thereby sealing off port 149, and connecting port 147 to port 145. Pressurized fluid from the charge pump also moves through passage 135 to chamber 163 where it communicates with piston 165 and also passes through restricting orifice 161 and valve ports 145 and 147 to chamber 175 where it communicates with piston 173. Piston 165 and piston 173 are connected by shaft 167 and directly oppose each other. However, inasmuch as piston 173 is larger than piston 165, equal pressures upon the two pistons causes the force of the larger piston to overcome the force of the smaller piston and springs 171, moving the piston to the left. Pressure in line 135 is ultimately controlled by a pressure relief valve made up of ball 137 and spring 139, the valve opening at a predetermined pressure and discharging excess pump fluid capacity to the sump. Pressurized fluid from passage 135 now moves through passage 187 to the lube channel of the right wheel pump and left wheel motor. Fluid then flows through the lube circuit of each pump to each timing valve and through the select-low valve to pressure channels A and B, causing all pump pistons and timing valves to move inward to engage the rotating cam ring. Pressurized fluid in channels A and B also moves through longitudinal pipes to the connecting wheel motor and through orifice 191 to the motor lube circuit. This causes the motor pistons and timing valves to move inward to engage their cam ring.

To disengage the four wheel drive system, the electric motor is turned off, causing the charge pump to stop rotation. Flow through orifice 159 causes a decrease in pressure in line 135 and chamber 155. Spring 143 causes valve 141 to move to the right, closing port 145 and connecting port 147 to port 149. As soon as port 147 is connected through port 149 and channel 157 to sump 169, pressure is quickly reduced in chamber 175 which corresponds with piston 173. Spring 171 moves pistons 173 and 165 to the right. As piston 165 strokes to the right, pressure in chamber 163 decreases to atmospheric, causing check valve 151 to close. Spring 171 continues to exert a force to move the pistons 163 and 171 to the right, decreasing pressure in chamber 163, and lines 135, 187, and 189 to below atmospheric. This negative gage pressure in the pump lube circuit also lowers the pressure in channels A and B through the select-low valve. In the motor, with pressure in lines A and B below atmospheric, check valves 193 and 195 open to exhaust motor lube pressure. With all pressures in both the wheel pump and wheel motor below atmospheric, external atmospheric pressure moves all pistons and timing valves outward, disengaging them from the cam rotors and allowing the rotors to spin freely.

To prevent any disproportionately high pressures from arising between the left and right motor circuits in sharp cornering maneuvers, a passage 183 with restricting orifice 185 connects to chamber 177 in the two motor housings. Double acting check ball 181 insures that chamber 177 connects to the higher pressure of channel A and B.

Figure 23:
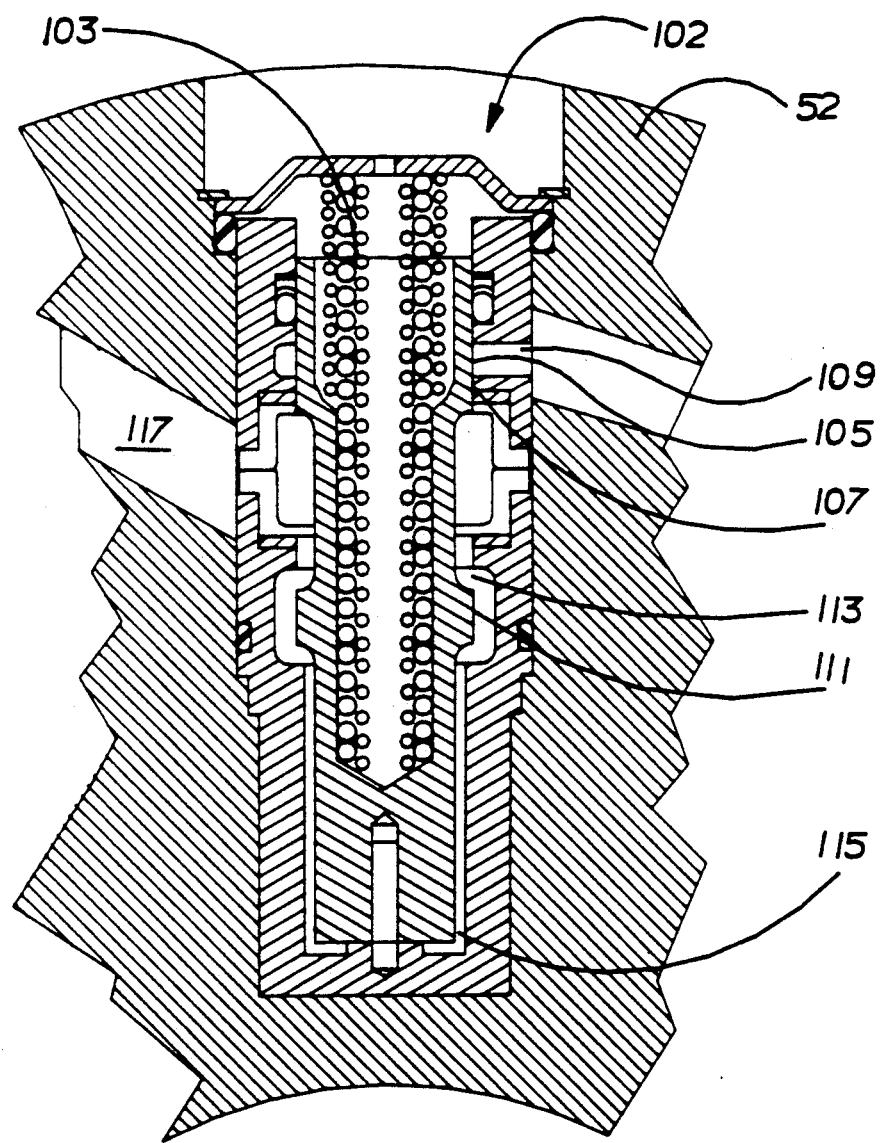
FIG. 23 is an enlarged cutaway drawing of the threshold valve.

Four threshold valves 102 are used to control pressure to the four auxiliary pistons in each motor. In its normal off position shown in FIG. 23, spring 103 holds the valve in its inward position, connecting port 113 to piston feed passage 117. The outside of the valve has three diametral sizes: largest diameter 105; middle sized diameter 107; and smallest diameter 111. Port 109 connects with the output of its corresponding timing valve, generating a force unbalance from the difference in areas of diameter 105 and diameter 107. Adding to this force unbalance is lube pressure entering from channel 106 through port 113 to chamber 115 and acting on diameter 107. The combined force unbalance thus generated is opposed by spring 103, and when the force is sufficiently large, the valve moves outward against the spring 103. When the valve moves outward, port 109 now corresponds with area difference of diameter 105 and diameter 111, causing a snap action in the valve motion. Passage 101 from the timing valve now connects with piston passage 117, causing the motor displacement to increase correspondingly. For the four threshold valves in each motor, the spring forces can all be equal to make the four valves act in concert, or the springs forces can be sequentially incremented to bring the auxiliary motor pistons in in a stepped sequence.

Figure 11:
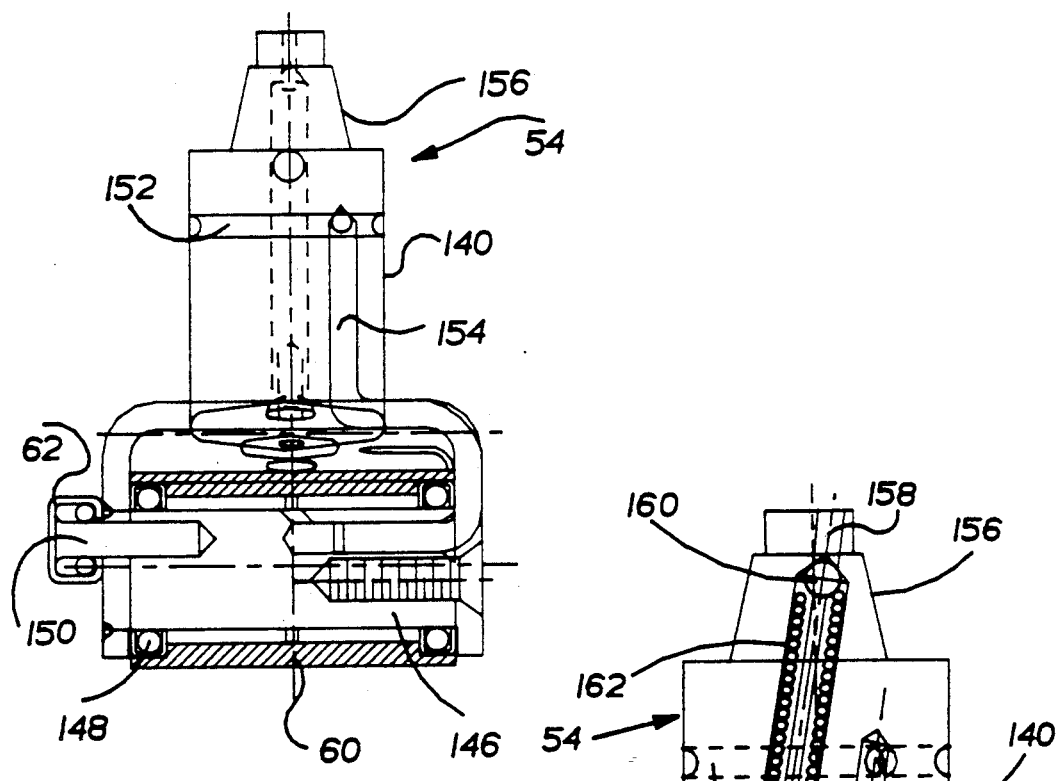
FIG. 11 is a side view of a piston roller assembly.
Figure 12:
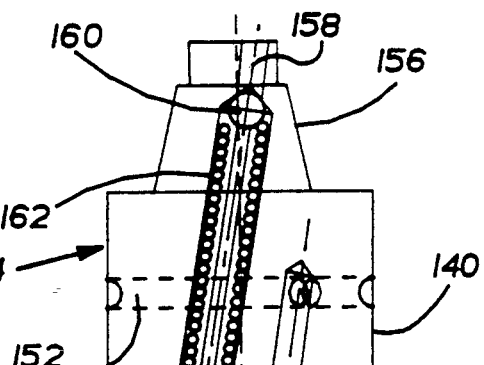
FIG. 12 is a right end view of FIG. 11.

A detailed drawing of the piston assembly is shown in FIGS. 11 and 12. Piston 54 has a generally cylindrical surface 140 for cooperating with the cylindrical bore of the cylinder block. Attached to the lower portion of the piston assembly is fork 142 which supports shaft 146 and roller follower 60. Roller follower 60 is mounted on shaft 146 supported by needle bearing assemblies 148. Alignment roller 62 is pivotably supported on stub shaft 150 to maintain the alignment of the roller follower with the cam as previously described.

A piston assembly 54 is provided with a lubrication system and an internal pressure relief valve. The outer cylindrical surface 140 is provided with a lubrication on groove 152, which during operation is generally aligned between O-ring grooves 128 and 130 in the cylindrical bore 156. An internal tubular passageway 154 connects groove 152 to bearings 148 as shown.

Piston assembly 54 has a raised head 156, as shown in FIGS. 11 and 12. Piston head 156 is provided with a pressure relief port 158. The pressure relief port is connected to groove 152 and the lubrication system. The pressure relief port is maintained in a normally closed position, as shown in FIG. 12 by ball 160 and spring 162. In the event an over pressure condition occurs which could potentially result in damage to the system, ball valve 160 will move off its seat to the open position, as shown in FIG. 11, allowing hydraulic fluid to flow from the chamber though the pressure relief port 158, to be exhausted into the lubrication system.

Figure 13:
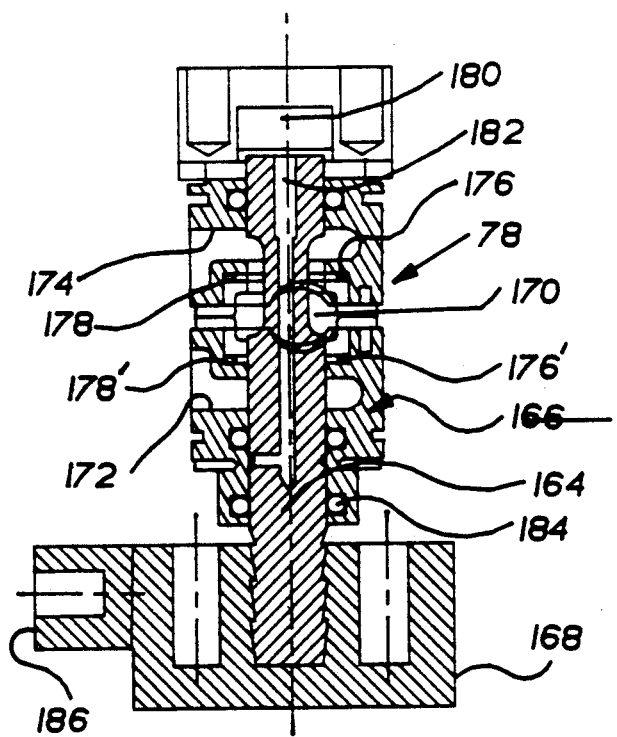
FIG. 13 is a side view of timing valve assembly.
Figure 14:
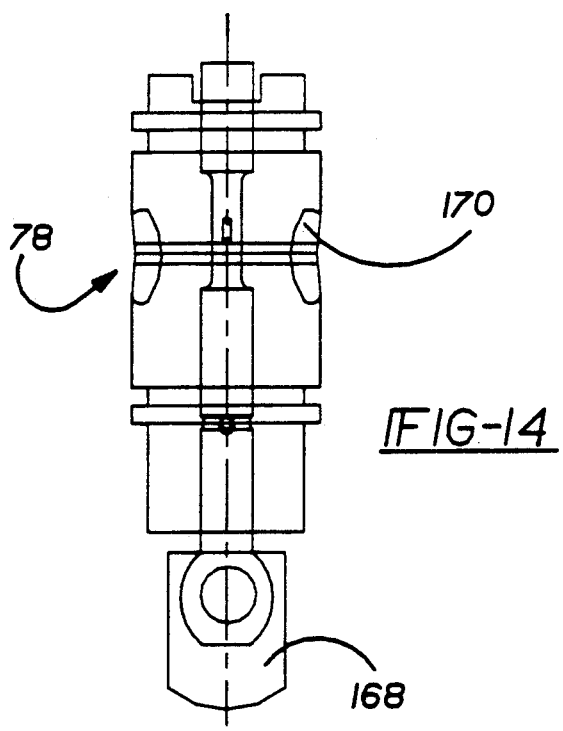
FIG. 14 is a right end view of FIG. 13.

A preferred embodiment of the timing valve assembly 78 is shown in FIGS. 13 and 14. The timing valve assembly is made up three basic parts: a spool valve 164; a body 166; and a follower 168. Body 166 is fabricated of a number of subparts which are pressed together for the ease in manufacturing, and define inlet/outlet port 170 and 170' which are coupled to two piston cavities by way of fluid passages in the valve body, such as passageways 118 and 120, shown in FIG. 8. Depending upon the position of the valve spool relative to the body, inlet/outlet port 170 is alternatively coupled to A port 172 or B port 174 which communicate with A port 122 and B port 124 in cylinder block 52 which are, in turn, coupled to A channel and B channel 108 and 110 in channel plate 150. The valve spool 164 has a central narrow region and two relatively larger diameter cylindrical regions on opposite ends thereto. The narrow region is of an axial length which only permits inlet/outlet port 170 to be coupled to one of ports 172 or 174. In the raised position, shown in FIG. 13, the A port 172 is blocked and the B port 174 is open. Preferably, elastomeric seals 176 are provided to prevent leakage between the valve spool and body, as shown. Elastomeric seals 176 are axially retained by the body structure, and are radially retained and positioned by O-ring 178 and 178'. The O-ring helps maintain proper radial alignment of elastomeric seal relative to the spool. The upper portion of the valve body, in conjunction with the valve spool end, define an enclosed cavity 180 which is coupled to the lubrication system. The lubrication system pressure tends to bias the valve spool to the extended position, thereby maintaining the follower in contact with rotary member 46. Preferably, the valve spool is provided with a vent port 182 which extends from the cavity 180 to the region of the spool periphery below A port 172. In the event there is any leakage of high pressure fluid past the valve body seal adjacent the A port, vent 182 will allow the fluid to return to the lubrication system, thereby minimizing leakage in the maximum pressure load, which will be seen by spool 194. Spool seal 194 is a conventional design, since it continually maintains contact with body and spool.

Valve spool follower 168 as shown in the preferred embodiment, is formed of a plastic material and pressed onto the valve spool. Since the valve spool follower loads are relatively low compared to the pistons, a roller follower is not necessary. Preferably, the radius of the follower surface in contact with the rotary member has a substantially similar radius as the roller follower of the piston assembly, so that the valve lift versus time curve is substantially the same shape as that of the piston assembly. Follower 168 is also provided with an alignment pin 186 which cooperates with a groove 64 in the channel plate to prevent valve spool and follower rotation.

Figure 15:
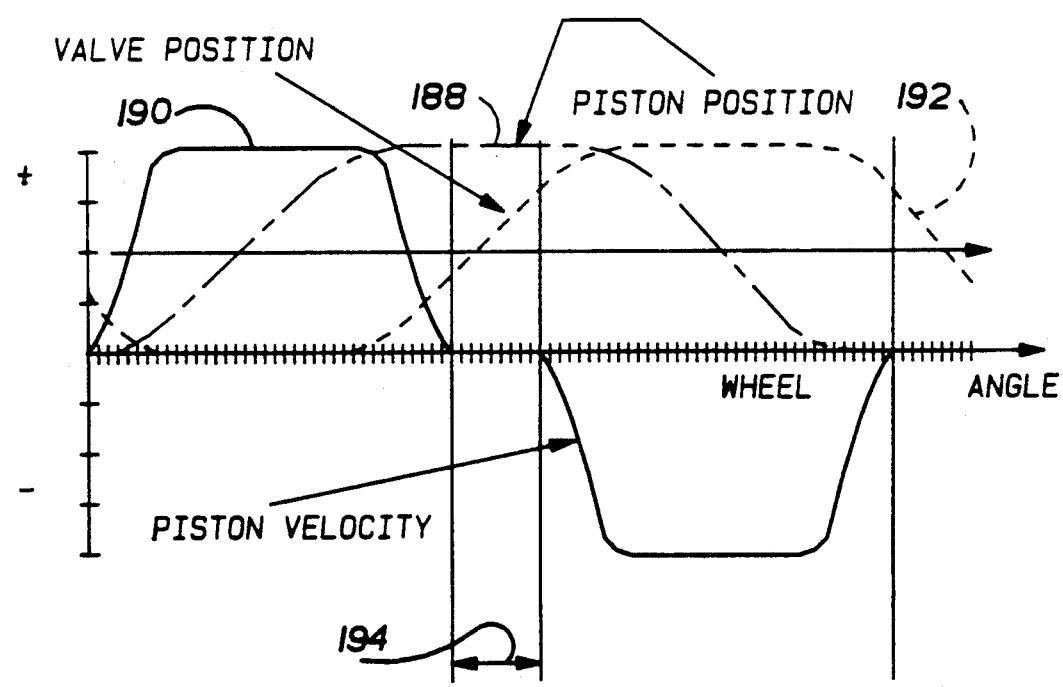
FIG. 15 is a plot of piston velocity and position as a relationship to valve position.

Piston and valve spool timing curves are shown in FIG. 15, which is a plot of lift versus time. Additionally, piston velocity is shown, since piston velocity is directly related to the flow rate of hydraulic fluid exiting or entering the chamber. Piston lift velocity are depicted by curves 188 and 190. Valve position is depicted by curve 192. The valve and piston lift curve are intentionally out of phase by an amount approximately equal to about one-half of the lift duration. As can be clearly seen from the curve shapes in FIG. 15, the piston and timing valve motion is not sinusoidal, rather there is a dwell period at both the crest and root of the curve and a constant velocity segment half way between. Piston velocity curve 190 is, in essence, a first derivative of piston position curve 188. During the dwell periods when piston is at the bottom and peak of its travel, piston velocity is zero, as shown in the curve segment indicated by double-ended arrow 194. It is during the dwell periods when piston velocity is zero and fluid flow is likewise zero and the valve spool shifts, causing the inlet/outlet port 70 to be coupled to the opposite port. For example, in a pump, when the piston is rising, the fluid inlet/outlet port is connected to the A port, and when the piston is descending the inlet/outlet is connected to the B port. In the motor, the motion would be just the opposite; when a piston is descending the inlet/outlet would be coupled to the A port, and when the piston is rising, the inlet/outlet would be coupled to the B port.

Figure 16:
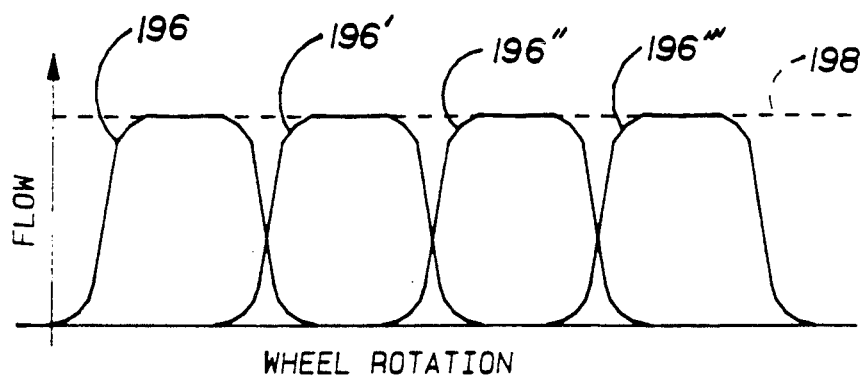
FIG. 16 is a composite plot of 4 pistons flow output pulses.
Figure 17:
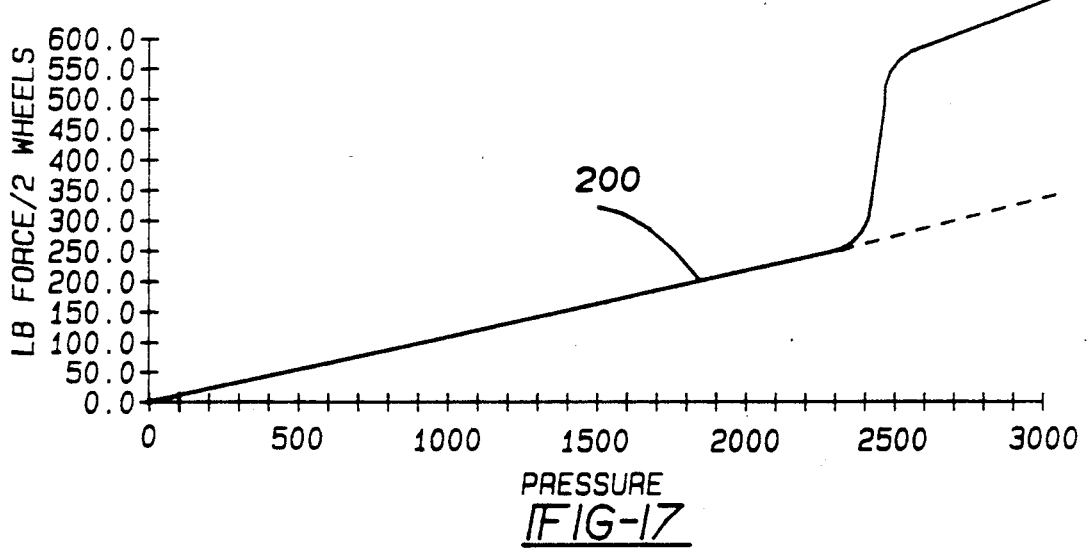
FIG. 17 is a plot of a non-mechanically driven wheel tractive force versus fluid pressure.

The flow output of the pump in A-line 134 is a composite of the pressure pulses from all of the cylinders. Similarly, the input to the pump from B-line 132 is a composite of all the input strokes from the various cylinders. The cam profile and follower construction, is preferably designed so that all of the individual output pulses cumulatively form a substantially uniform flow rate. As can be seen in FIG. 16, the flow output for 1/7th of a revolution yields four discrete pulses, 196, 196', 196" and 196'", which can be cumulatively added to provide a steady flow rate 198. There are only four pulses in a 1/7th of a revolution, as opposed to eight, since each pulse represents the output of two cylinders similarly timed. The flow input and flow output of both the motor and the pump are both substantially uniform, thereby eliminating the cost and energy losses associated with an accumulator.

As previously described, the preferred motor has dual displaced modes; a synchronous mode in which the motor and pump rotate at substantially same speeds, and a non-synchronous mode which the pump turns faster than the motor. As can be seen in FIG. 16, the torque of the hydraulically driven wheel pair is directly related to pressure, as one would expect. This relationship is substantially linear. The higher the pressure, the higher the wheel torque. In a preferred embodiment, threshold valve 102 is pressure activated automatically when the line pressure exceeds 2500 psi. When threshold valve 102 opens, the motor displacement increases by an amount proportional to the displacements of the added cylinders, resulting in the step in a tractive force curve 200. As previously indicated, the threshold valve could alternatively be manually operated by the vehicle occupant using the alternate manual drive input, which is shown schematically in FIG. 10.

Figure 18:
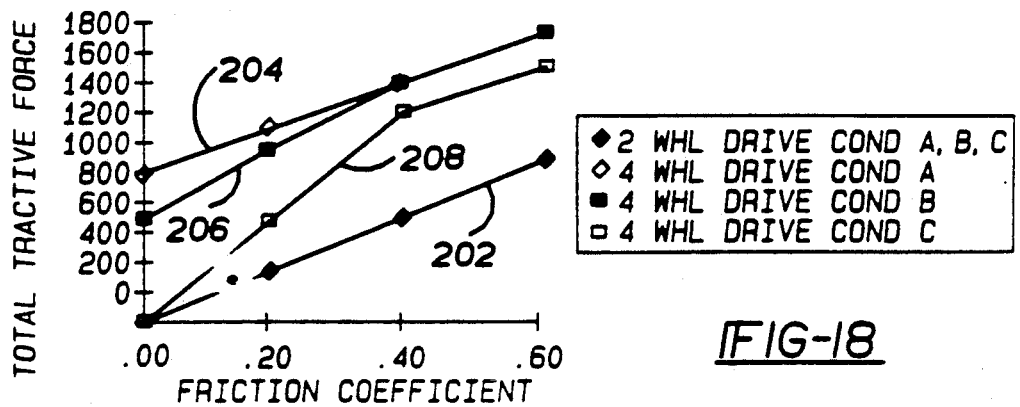
FIG. 18 is a plot of tractive force versus friction coefficient for a number of different drive conditions.

The beneficial effect of the hydraulic pump and motor four wheel drive system on a vehicle's performance is schematically shown in FIG. 18. Curve 202 is a plot of total tractive force versus friction coefficient for a two wheel drive vehicle having either one of its primary drive wheels on a low friction surface. In the four wheel drive mode, curve 204 represents the total tractive force available when one of the primary drive wheels is on a low coefficient surface and the remaining three wheels are on a high coefficient surface. When one entire side of the vehicle is on a low coefficient surface in the four wheel drive mode, as shown in curve 206, tractive force is slightly lower than curve 204, but substantially higher than the two wheel drive condition. When all four wheels are on a low coefficient friction as shown in curve 208, tractive force is still substantially better with the hydraulic four wheel drive system employed.

The hydraulic four wheel drive device works when a vehicle is operating in reverse as well as in forward, as previously mentioned. When the vehicle is running in the forward mode, A pressure is high and B pressure is low. In reverse, A pressure becomes low and B pressure becomes high. Since the lubrication system is directly coupled to the B pressure in the forward mode, when the vehicle shifts into reverse, it is necessary to couple the lubrication to the A pressure line to avoid full line pressure from entering into the lubrication system. A low select valve 210 connects the lubrication line 136 alternatively to A pressure line 134 or B pressure line 132, as shown in FIG. 10.

Figure 19:
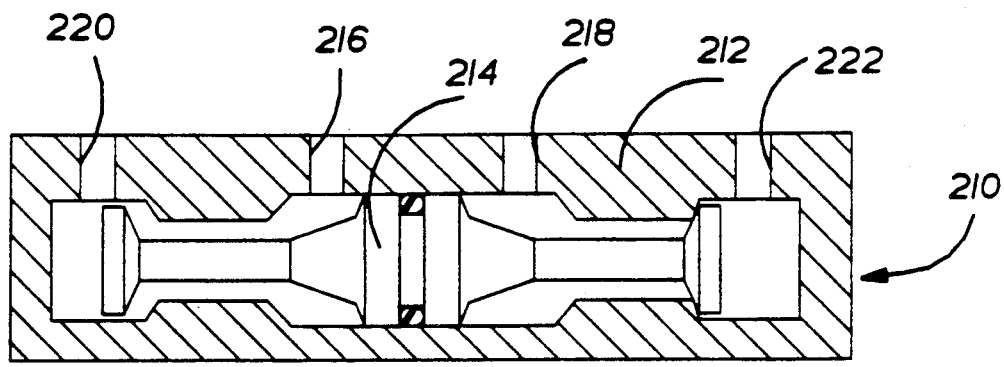
FIG. 19 is an enlarged cut-away view of the select low valve.

An enlarged, low select valve is shown cut-away in FIG. 19. The valve consists of a body 212 and a spool 214. The valve body has two inlets, A inlet 216, and B inlet 218. The body is also provided with two outlets, an A outlet 220 and a B outlet 222. The spool shifts between an A position shown, in which the A inlet is coupled to the A outlet when pressure B is higher than pressure A, to a B position, where the valve would be moved to the extreme right and the B inlet would be coupled to the B outlet, and the A outlet would be closed. The spool automatically shifts to the appropriate position so that the outlet to the lube circuit will be coupled to the fluid inlet having the lowest pressure.

FOUR WHEEL TORQUE CONTROL

The concept of independent torque control for a four wheel drive vehicle is currently the area of interest in the automotive engineering community. In order to achieve maximum directional stability, a vehicle maneuver is desirable to effectively utilize all of the load bearing capacity of each of the vehicle's wheels. Typically, in any type of turning maneuver, the vehicle will lose directional stability when one of the vehicle's four wheels exceeds the allowable wheel load, resulting in uncontrolled slippage. The concept of independently controlling wheel torques is discussed in The Society of Automotive Engineer's Technical Paper 880701, Donald Margolis et al. *Directional Stability Augmentation for*

*All Wheel Drive Vehicles*, February, 1988, which is incorporated by reference herein.

Figure 20:
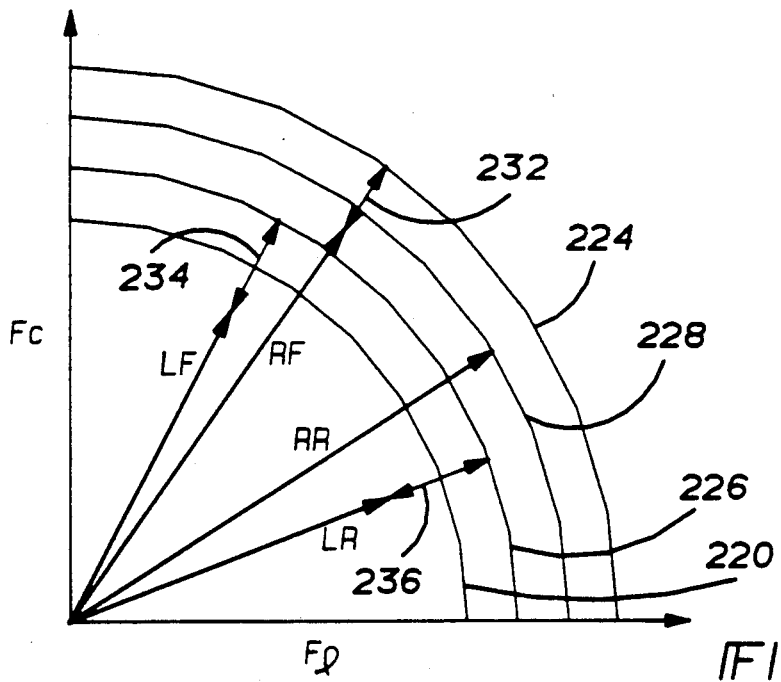
FIG. 20 is a load distribution diagram.

FIG. 20 shows a plot of wheel load vectors for each of the four wheels of the vehicle, where cornering force is the Y-axis, and lateral force is the X-axis. The four vectors designated RF, LF, RR and LR represent the load on the four vehicle tires; right front, left front, right rear and left rear. The tire roadway breakaway load curves are depicted by semicircular lines 224-226 which show the breakaway load for each of the vehicle tires. Note that the breakaway load for each wheel is different as a result of varying normal forces due to weight distribution and lateral acceleration. The four vectors shown depict the maximum cornering force situation without torque control. Any additional lateral acceleration will cause the load vector RR to exceed the limits of curve 228 resulting in the right rear wheel breaking loose and the entire vehicle to spin out of control. Additional lateral acceleration could be achieved, however, if the other three wheels could be more effectively utilized. Double ended arrows 232, 234 and 236 represent the unused capacity of the right front, left front and left rear tires, respectively.

Figure 21:
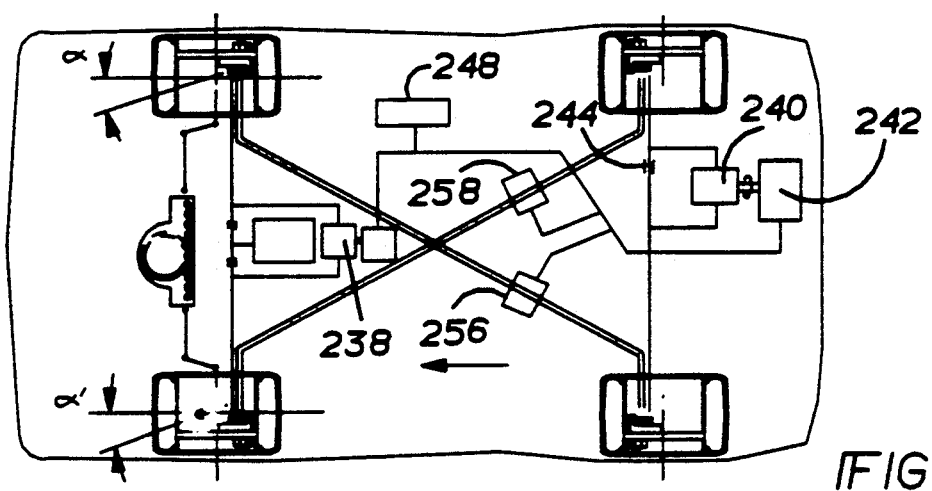
FIG. 21 is a plan view of a vehicle having an alternative embodiment of the invention equipped with a torque control system.
Figure 22:
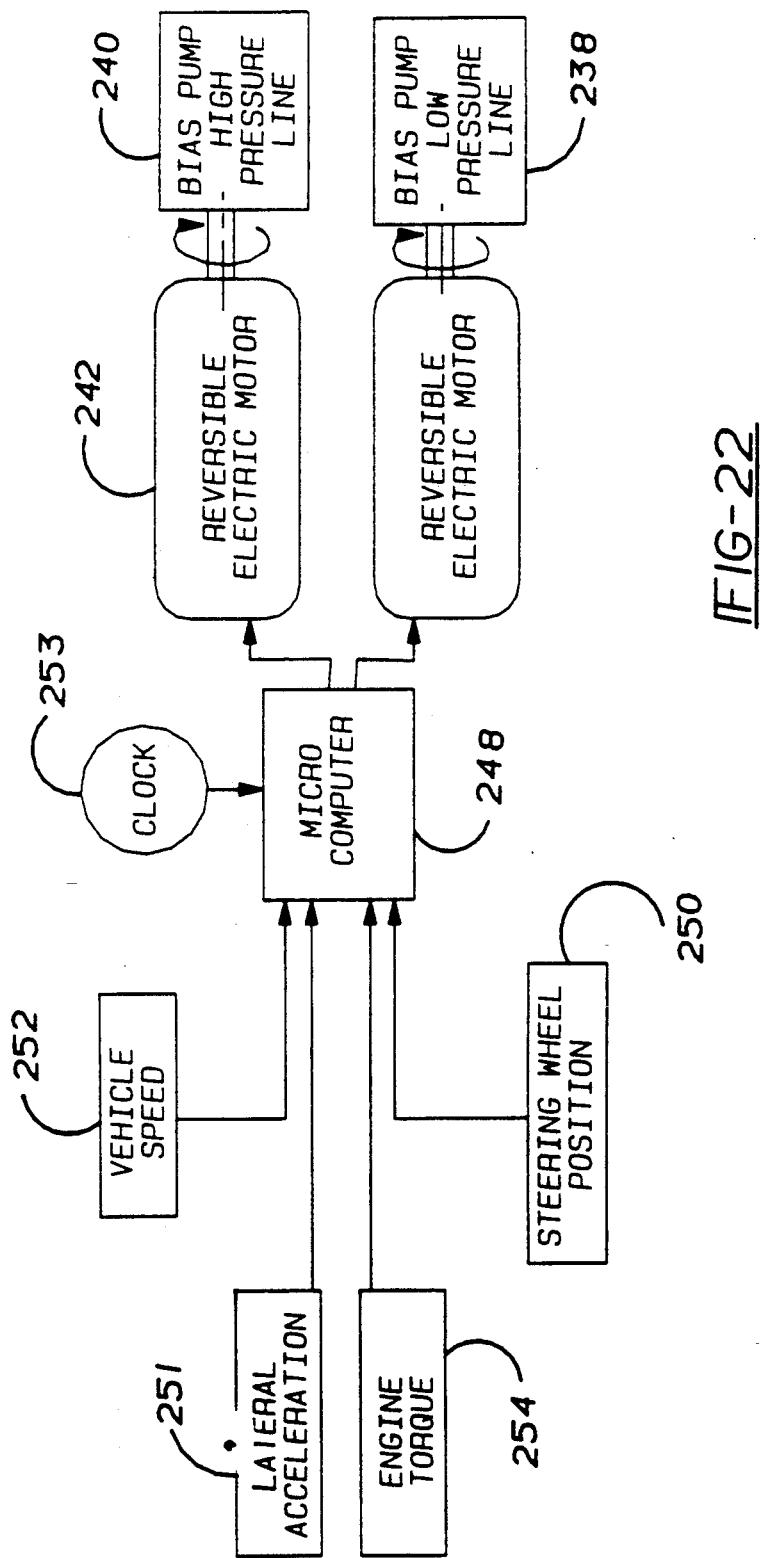
FIG. 22 is a schematic diagram for the alternative embodiment shown in FIG. 21.

An alternative embodiment of the present invention is shown in FIGS. 21 and 22 which utilizes a low pressure bias pump 238 and a high pressure bias pump 240 to transfer fluid pressure from one side of the vehicle to the other. For example, when the vehicle shown in FIG. 21, makes a left turn caused by the rotation of the front wheels through an angle $\alpha$, $\alpha'$, the four tires will be loaded in a manner similar to that shown in FIG. 20. In order to maximize lateral acceleration, the high pressure bias pump 240 will be driven by motor 242 in the direction which would cause a transfer of fluid from the left rear hydraulic motor to the right rear hydraulic motor.

The hydraulic pump is coupled to the line connecting the right and left rear wheels on opposite sides of a restriction 244 which enables substantially different pressures to be applied to each of the hydraulic motors. Since the hydraulic fluid is substantially incompressible, very little actual fluid needs to be transferred from one motor to the other to cause a substantial change in pressure and resulting tractive force. The high pressure pump motor 242 and corresponding low pressure pump motor 246 can be rotated in either direction in response to a control signal from a microprocessor 248. Microprocessor 248 regulates the operation of both bias pumps dependent upon driving conditions and receives inputs from steering angle, lateral acceleration vehicle velocity, time and drive torque from sensor 250, 251, 252, 253 and 254 of a conventional design. The bias pumps transfer torque side to side, however, there is some front to rear effect as a result connection of the pumps and motors.

To further control front to rear distribution if necessary bypass valves 256 and 258 may be installed in the hydraulic lines connecting the motor and pump to allow some of the fluid to short circuit or bypass the pump which effectively transfer load to the front mechanically driven wheel. Once again, like the bias pump, very little fluid needs to be transferred to affect a significant torque change. Utilize front and rear bias pumps in combination with bypass valves, the torque of each wheel can be independently controlled during a vehicle maneuver to optimize tractive force and directional stability. The hydraulic drive system readily lends itself to independent control.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

I claim:

1. A hydraulic drive apparatus for use with a motor vehicle having a mechanically driven wheel and a non-mechanically driven wheel, said hydraulic driving apparatus comprising:

a rotary hydraulic fixed displacement pump driven by the mechanically driven wheel;

a rotary hydraulic motor driving the non-mechanically driven wheel, the motor including a first set of piston/cylinders, having a collective displacement substantially equal to the displacement of the pump, and a second set of piston/cylinder assemblies, which are shiftable between an inoperative position in a synchronous mode and an operative position in a non-synchronous mode;

means for shifting the second set of piston/cylinder assemblies between the synchronous and the non-synchronous modes in the event of the occurrence of a predetermined amount of slippage of the mechanically driven wheel relative to the non-mechanically driven wheel; and conduit means for hydraulically coupling the rotary hydraulic pump and the rotary hydraulic motor;

wherein when the rotary hydraulic motor is in the synchronous mode, the pump and the motor have substantially equal displacements and rotate at the same speed and when in the non-synchronous mode, the motor has a substantially greater displacement than the pump and rotates at a lower speed than the pump thereby increasing the torque output of the hydraulic motor to the non-mechanically driven wheels.

2. The invention of claim 1 wherein said first set of piston/cylinder assemblies comprises a plurality of first variable displacement cylinders each providing a flow pulse during a rotation of the non-mechanically driven wheel the cumulative sum of which form a substantially uniform flow output with respect to the non-mechanically driven wheel velocity, said second set of piston/cylinder assemblies comprises a plurality of second variable displacement cylinders each providing a flow pulse during a rotation of the non-mechanically driven wheel the cumulative sum of which forms a uniform flow output with respect to the non-mechanically driven wheel velocity.

3. The invention of claim 1 wherein the shifting means is responsive to the pressure in the conduit means.

4. The invention of claim 1 wherein the flow rate of the rotary hydraulic pump, and the rotary hydraulic motor, in each of the synchronous and non-synchronous modes is a substantially uniform function of wheel angular velocity.

5. The invention of claim 4 wherein said pump is provided with a plurality of variable displacement cavities, each providing at least one flow pulse as a result of wheel rotation, said plurality of variable displacement cavities generating a plurality of flow pulses cumulatively forming a substantially uniform flow output with respect to wheel rotational velocity.

* * * * *